United States Patent [19]

Parfitt

[11] Patent Number: 4,768,706

[45] Date of Patent: Sep. 6, 1988

[54] INDICATING AND CONTROL INSTRUMENTS

[76] Inventor: Ronald H. Parfitt, 88 Broadway, Letchworth, Hertfordshire, England

[21] Appl. No.: 58,149

[22] Filed: Jun. 4, 1987

[51] Int. Cl.[4] .......................... G05D 23/00; G01K 1/02
[52] U.S. Cl. ..................................... 236/94; 165/11.1; 116/216
[58] Field of Search ........................ 236/94; 165/11 R; 116/216; 374/152; 338/174, 196

[56] References Cited

U.S. PATENT DOCUMENTS

| | | | |
|---|---|---|---|
| 2,786,924 | 3/1957 | Kronmiller | 338/196 X |
| 3,134,086 | 5/1964 | Caddock et al. | 338/196 |
| 4,582,251 | 4/1986 | Odom, Jr. et al. | 236/94 |

Primary Examiner—William E. Wayner
Attorney, Agent, or Firm—Marjama & Pincelli

[57] ABSTRACT

An indicating instrument, for example a temperature controller, which is responsive to a parameter, such as temperature, of an associated system or apparatus comprises a first display arranged in an annular configuration and providing a visual indication of a set-point value of the parameter, a handwheel to adjust the set-point value to a different set-point value, and a second display providing a visual indication of an operating condition of the instrument or of the current value of the parameter. This second display is located within the annulus of the analogue set-point display. Preferably, the second display provides an indication of the difference between the current value of the parameter and the set-point value as shown by the marker. A series of LEDs may be used as the second display.

7 Claims, 3 Drawing Sheets

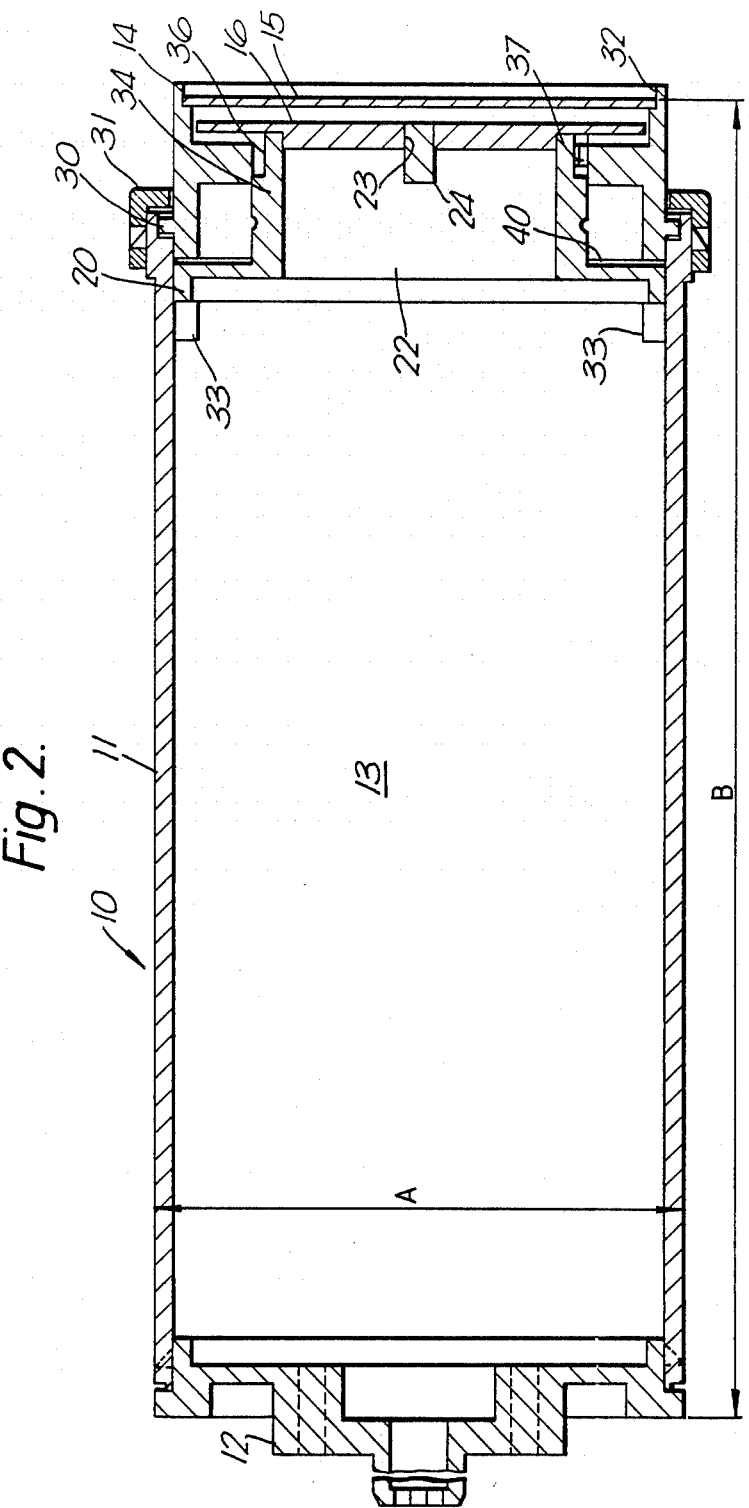

INDICATING AND CONTROL INSTRUMENTS

FIELD OF THE INVENTION

This invention relates to indicating instruments, and is more particularly concerned with indicating instruments which also exert a control function. Thus, operating parameters of systems or apparatus, such as temperature, pressure or length of time of operation, may be indicated and/or controlled.

DESCRIPTION OF THE PRIOR ART

Control instruments are known which include a scale or dial having a marker which indicates the selected magnitude, i.e. the set point, of an operating condition of an associated system or apparatus. For example, a temperature control for an oven may include a dial marked in degrees Celsius. In order to select a desired operating temperature, the dial is turned until a pointer on the dial points to the desired temperature. The controller communicates that temperature to the oven thermostat and the oven heats up to that temperature.

However, such controllers give no indication as to whether or not the selected magnitude of the parameter, e.g. the selected temperature, has been reached, or how close the system or apparatus is to reaching it.

It is known, for example in domestic oven controls, to provide a separate indicator light which is extinguished when the desired temperature, or other condition, has been reached. However, such indicators give only a very rough guide as to the exact condition of the system or apparatus.

It would be an advantage, particularly for industrial users, where specific operating conditions must be maintained for satisfactory operation, to provide a clear indication of the deviation of actual conditions from a set point.

It is known to provide a separate meter, for use in conjunction with a control instrument, which gives a reading of an operating condition for comparison with that selected, or which indicates the deviation of the operating condition from that selected. However, the use of such a separate meter, in addition to the control instrument itself, is disadvantageous, inter alia in requiring additional space.

SUMMARY OF THE INVENTION

In accordance with the present invention there is provided an indicating instrument responsive to a parameter of an associated system or apparatus, the instrument comprising first display means arranged in an annular configuration and providing a visual indication of a set-point value of said parameter, means to adjust said set-point value to a different set-point value, and second display means providing a visual indication of an operating condition of the instrument or of the current value of said parameter, wherein said second display means is located within the annulus of said first display means.

Preferably, said second display means provides an indication of the difference between the current value of said parameter and the set-point value.

Preferably, the second display means comprises one or more light-emitting diodes. With a plurality of light-emitting diodes one can arrange them in a bar-graph configuration to provide a visual indication upscale and downscale of the set-point value.

Alternatively, the second display means can be a digital display of the current value of the parameter.

The first display means may comprise a handwheel rotatably mounted on a casing of the instrument and carrying a marker which traverses an analogue scale. The scale may be provided around the edge of a circular dial plate which is provided with one or more apertures through which the second display means is visible.

In a preferred embodiment of the invention, the instrument includes an annular potentiometer mounting plate positioned rearwardly of the handwheel, with the annular mounting plate defining a chamber rearwardly of the first display means within which the second display means is located.

The indicating instrument of the present invention is particularly applicable to the indication of temperature, and by extension, to providing temperature control.

However, although the instrument of the present invention is particularly applicable to temperature indication and/or control, it can be used also for monitoring other parameters, such as pressure, time, etc. In the case of a time controller, the instrument might include a first scale indicating the set length of time for which an associated system or apparatus is set to operate, and a second display indicating how much of that time period has elapsed, thus providing an indication as to how much longer the associated system or apparatus will function.

In a preferred embodiment of the present invention, designed as a temperature controller, it is possible to combine the important operational features of constant visual set-point and temperature indication with selectable control and output capabilities.

BRIEF DESCRIPTION OF THE DRAWINGS

A preferred embodiment of the invention will now be described by way of example and with reference to the accompanying drawings, in which:

FIG. 2 is a sectional side view taken along the line II—II in FIG. 1, details of the electronic circuitry being omitted for clarity; and, FIGS. 3A, 3B and 3C are front face views of three different forms of temperature controller in accordance with the present invention, each providing a different form of display.

DESCRIPTION OF THE PREFERRED EMBODIMENT

Figure 1:
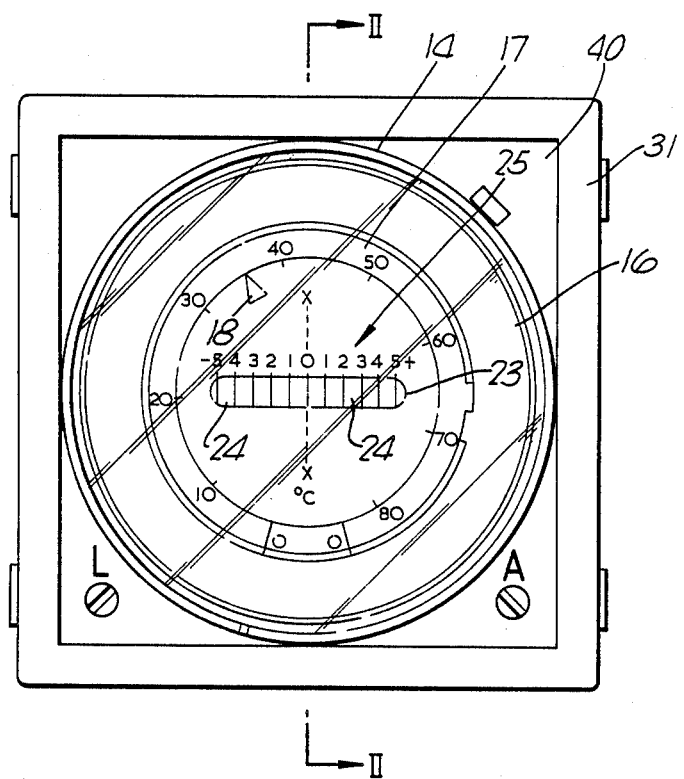
FIG. 1 is a front view of the face of a temperature controller constructed in accordance with the present invention.

Referring to FIGS. 1 and 2 of the drawings, a control instrument is illustrated, for use in controlling temperature. The instrument, indicated generally at 10, has a casing 11 which is substantially square in crosssection. One end of the casing is fitted with a standard base 12 having the usual pin connections for connecting the instrument to the apparatus which it is to control. The space 13 within the casing houses the necessary electronic circuitry for the instrument, for example in the form of a number of circuit boards.

An annular handwheel 14 is rotatably mounted on the front of the casing 11. As can be seen from FIG. 1, the handwheel is generally annular and fits snugly within the casing 11. The wheel has an outer rim 30 which prevents it from sliding right into the casing, and is held in place on the front of the casing by a front bezel 31. The handwheel has a small recess 32 at the front, in which is fitted a plate 15 of rigid clear plastics material or some other transparent material. The plate 15 serves as a window through which to view a dial 17 which is carried by a dial mounting plate 16. The dial mounting plate is fixed with respect to the casing in a manner which will be described hereinafter. The dial is marked off with a temperature scale in degrees Celsius. The transparent plate 15 has a marker arrow 18 marked on it. Thus, as the handwheel is rotated with respect to the casing, the arrow moves over the scale.

An annular potentiometer mounting plate 20 is provided which is mounted at the front end of casing 11 behind the handwheel 14. The mounting plate 20 is mounted between stops 33 provided within the casing, and the handwheel 14. The mounting plate 20 is generally annular and has a portion 34 extending forwardly within the handwheel 14. The dial mounting plate has a rearwardly extending portion which fits within the potentiometer mounting plate 20. The potentiometer itself comprises a strip of metal, not visible in the drawings, which extends partially around a seating surface 36 of the mounting plate. One end of the metal strip is connected to the circuitry. The handwheel carries a contact 37 which presses against the metal strip and is also connected to the circuitry. Thus, as the handwheel is rotated, the length of metal, and hence the resistance, between the two connections is varied.

To complete the construction, a contact plate 40 is provided between the handwheel and the potentiometer mounting plate, which serves to keep the handwheel in place and to close the end of the casing 11.

As can be seen from FIG. 2, this construction leaves a chamber or space 22 behind the dial mounting plate 16 which is not present in the conventional construction. The chamber 22 here houses an array of light-emitting diodes (LEDs) 24. The LEDs are mounted as a multi-segment bar-graph display in an aperture 23 formed in the dial mounting plate 16 whereby they may be viewed through the transparent plate 15. The LEDs are connected to the potentiometer and to associated sensing means such as thermocouples in such a way that they provide an indication of the deviation of the actual temperature of the associated system or apparatus from the selected set-point temperature. The centre line X—X of the array indicates the selected set-point temperature. If any of the LEDs to the left of the centre line are illuminated, this indicates that the actual temperature is lower than that selected, and if any of the LEDs to the right of the centre line are illuminated, this indicates that the actual temperature is higher than that selected. Preferably, the arrangement is such that the number of LEDs which are lit up is proportional to the deviation of temperature from the set-point, and a suitable scale 25 is provided on the rows of LEDs. Preferably, the LEDs on the left are green and the LEDs on the right are red. Thus, for example, as the temperature drops below the selected value, successive LEDs, beginning with the LED immediately to the left of the line X—X, light up.

The necessary connections for the LEDs pass out of the chamber 22 and are connected to the circuitry housed in the space 13.

The instrument 10 is preferably the same size as currently available standard temperature controllers. Thus, an existing temperature controller may easily be replaced by a controller such as that described above without the need for any extra space.

The depth A of the casing 11 is 85 mm, and the total length B of the instrument, excluding the pins at the base, is 215 mm. In an instrument manufactured to the above sizes, the chamber 22 would, alternatively, be sufficiently large to house a small ammeter. Thus, such an ammeter could be used instead of the LEDs as the second display, for example to indicate temperature deviation. A second circular scale indicating the temperature deviation could be provided on the dial mounting plate 16 and a pointer, projecting through a suitable hole in the dial mounting plate, could traverse the second scale.

The electronic circuitry housed in the casing space 13 would perform the usual function of providing appropriate signals to control a thermostat in response to analog signals from the potentiometer. Extra circuitry would be required for comparing the actual temperature of an associated system or apparatus, as sensed for example by thermocouples, with the set-point temperature and causing the LEDs or ammeter to give the appropriate reading.

The controller shown in FIG. 1 includes a lock L which is operated to lock the handwheel in place once the desired set-point temperature has been selected. An adjuster A is provided to centre the temperature variations on a desired point.

Figure 3A:
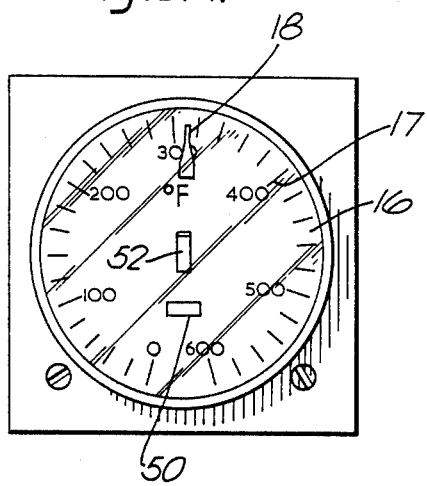
Figure 3B:
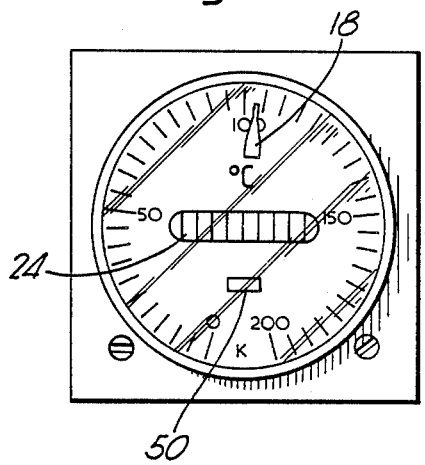
Figure 3C:
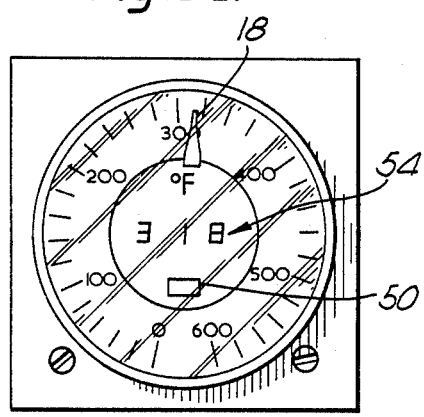

FIGS. 3A, 3B and 3C show alternative types of display for temperature controllers of the present invention. In FIG. 3A there is an analog set-point display provided by the marker 18 and the circular scale 17. Within the visual area defined by the scale 17 there are two slots in the dial plate 16. The lower slot 50 provides red LED illumination to indicate that the output of the temperature controller is "on". The upper slot 52 provides yellow LED illumination indicating that power is "on". Thus, in this embodiment, the visual indication at 52 is indicative of an operating condition of the instrument, not of the current value of the temperature being monitored. Such a low-cost instrument is ideally suited to applications where an indication of process temperature is not essential.

FIG. 3B shows an arrangement which is very similar to that shown in FIG. 1. The additional feature here is the provision of the lower indicator 50 which again is a red LED illumination to indicate output "on".

In FIG. 3C, the second display, within the annular analog set-point display, is a digital display 54 of the current process temperature. In yet a further alternative embodiment, not illustrated, the centre of the instrument could be provided both with an LED display and with a digital display.

As illustrated in the drawings, especially in FIG. 2, the instrument of the present invention is a stand-alone instrument for panel, base or wall mounting. Alternatively, the "front end" of the instrument, i.e. the part in front of the stops 33, can be formed as a panel-mounted module to be used with a separate, independently sited control module which provides the control and output functions. The panel-mounted module can be connected to the control module by suitable cable connections. This reduces back-of-panel projection to a minimum. It can also provide additional control functions which would otherwise result in an unacceptable increase in normal instrument body length.

While the invention has been particularly shown and described with reference to a preferred embodiment thereof, it will be understood by those skilled in the art that changes in form and details may be made therein without departing from the spirit and scope of the invention.

I claim:

1. An indicating instrument responsive to a parameter of an associated system or apparatus, the instrument comprising first display means arranged in an annular configuration and providing a visual indication of a set-point value of said parameter, means to adjust said set-point value to a different set-point value, a handwheel rotatably mounted on a casing of the instrument and carrying a market which traverses an analog scale, said analog scale being provided around the edge of a circular dial plate which is provided with one or more apertures through which said ssecond display means is visible, an annular mounting plate for a potentiometer positioned rearwardly of the handwheel, said annular mounting plate defining a chamber rearwardly of said first display means in which said second display means is located, and second display means providing a visual indication of an operating condition of the instrument or of the current value of said parameter, wherein said second display means is located within the annulus of said first display means.

2. An instrument according to claim 1, in which said second display means provides an indication of the difference between the current value of said parameter and the set-point value.

3. An instrument according to claim 1, in which said second display means comprises at least one light-emitting diode.

4. An instrument according to claim 3, in which the second display means comprises a plurality of light-emitting diodes arranged in a bar-graph configuration to provide a visual indication upscale and downscale of the set-point value.

5. An instrument according to claim 1, in which said second display means is a digital display of the current value of said parameter.

6. An indicating instrument responsive to a parameter of an associated system or apparatus, the instrument comprising first display means arranged in an annular configuration and providing a visual indication of a set-point value of said parameter, means to adjust said set-point value to a different set-point value, and second display means providing a visual indication of an operating condition of the instrument or of the current value of said parameter, wherein said second display means is located within the annulus of said first display means, the instrument comprising a casing, an annular potentiometer mounting plate positioned within the casing, a potentiometer carried by said mounting plate, a rotatable handwheel positioned forwardly of and circumferentially around the mounting plate, a bezel holding the handwheel on the casing, and a dial plate forwardly of and within the handwheel and having a scale thereon for association with a marker carried by the handwheel, said second display means being located within a chamber defined by the annular mounting plate and being located substantially centrally of the dial plate.

7. An instrument according to claim 6, which includes sensing means responsive to the parameter being monitored, and control means arranged to exert a control function in response to the sensed parameter.

* * * * *